(12) United States Patent
Ono et al.

(10) Patent No.: US 7,366,598 B2
(45) Date of Patent: Apr. 29, 2008

(54) DEVICE FOR ESTIMATING DRIFT AMOUNT OF LATERAL ACCELERATION SENSOR, DEVICE FOR CORRECTING OUTPUT OF LATERAL ACCELERATION SENSOR, AND DEVICE FOR ESTIMATING ROAD SURFACE FRICTION STATE

(75) Inventors: Eiichi Ono, Toyota (JP); Ken Koibuchi, Susono (JP); Kenji Asano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 669 days.

(21) Appl. No.: 10/745,557

(22) Filed: Dec. 29, 2003

(65) Prior Publication Data

US 2004/0186649 A1    Sep. 23, 2004

(30) Foreign Application Priority Data

Jan. 22, 2003    (JP) .............................. 2003-013844

(51) Int. Cl.
*B62D 6/00* (2006.01)
*B62D 15/00* (2006.01)
*G06F 7/00* (2006.01)
*G06F 19/00* (2006.01)

(52) U.S. Cl. ........................... 701/34; 701/43; 702/104

(58) Field of Classification Search ................. 701/34, 701/80, 70, 79, 36, 29, 43; 73/1.37, 1.38, 73/862.08; 303/146; 180/197; 324/537; 702/104, 41

See application file for complete search history.

(56) References Cited

U.S. PATENT DOCUMENTS

| | | | |
|---|---|---|---|
| 4,882,693 A | 11/1989 | Yopp | |
| 5,742,918 A * | 4/1998 | Ashrafi et al. | 701/70 |
| 5,809,434 A * | 9/1998 | Ashrafi et al. | 701/1 |
| 6,122,577 A | 9/2000 | Mergenthaler et al. | |
| 6,163,747 A | 12/2000 | Matsuno | |
| 6,244,109 B1 | 6/2001 | Kohler et al. | |
| 6,276,188 B1 * | 8/2001 | Horiuchi | 73/1.37 |
| 6,285,933 B1 | 9/2001 | Kohler et al. | |
| 6,374,172 B1 * | 4/2002 | Yamaguchi et al. | 701/90 |
| 6,542,800 B2 * | 4/2003 | Kawazoe et al. | 701/41 |
| 6,718,279 B2 | 4/2004 | Bustgens et al. | |
| 7,085,642 B2 * | 8/2006 | Samuel et al. | 701/82 |

FOREIGN PATENT DOCUMENTS

| | | |
|---|---|---|
| DE | 3938 039 A1 | 5/1991 |
| DE | 38 78 674 T2 | 6/1993 |
| DE | 195 34 760 A1 | 3/1996 |
| DE | 196 36 443 A1 | 3/1998 |

(Continued)

*Primary Examiner*—Thomas Black
*Assistant Examiner*—Christine M Behncke
(74) *Attorney, Agent, or Firm*—Oliff & Berridge, PLC

(57) ABSTRACT

An SAT estimating section estimates self-aligning torque (SAT) on the basis of a steering torque, which is detected by a steering torque detecting section, and an assist torque, which is detected by an assist torque detecting section. An SAT model value computing section computes an SAT model value by using an integrated slip angle $\alpha_I$. An SAT ratio/drift amount computing section computes, by on-line identification, a ratio (SAT ratio) of the SAT to the SAT model value, and a drift amount of a lateral acceleration sensor.

13 Claims, 4 Drawing Sheets

FOREIGN PATENT DOCUMENTS

| | | |
|---|---|---|
| DE | 198 44 090 A1 | 4/1999 |
| DE | 198 44 880 A1 | 4/2000 |
| DE | 198 44 913 A1 | 4/2000 |
| DE | 199 10 868 A1 | 9/2000 |
| DE | 101 28 056 C1 | 11/2002 |
| GB | 2 293 477 A | 3/1996 |
| JP | A 9-5352 | 1/1997 |
| JP | A 11-281672 | 10/1999 |

* cited by examiner

DEVICE FOR ESTIMATING DRIFT AMOUNT OF LATERAL ACCELERATION SENSOR, DEVICE FOR CORRECTING OUTPUT OF LATERAL ACCELERATION SENSOR, AND DEVICE FOR ESTIMATING ROAD SURFACE FRICTION STATE

CROSS-REFERENCE TO RELATED APPLICATION

This application claims priority under 35 USC 119 from Japanese Patent Application No. 2003-13844, the disclosure of which is incorporated by reference herein.

BACKGROUND OF THE INVENTION

1. Field of the Invention

The present invention relates to a device for estimating a drift amount of a lateral acceleration sensor, a device for correcting output of a lateral acceleration sensor, and a device for estimating a road surface friction state, and in particular, to a device for estimating a drift amount of a lateral acceleration sensor which estimates the drift amount of a lateral acceleration sensor without using the difference in wheel speeds between the left and right wheels, and to a device for correcting output of a lateral acceleration sensor which corrects lateral acceleration in accordance with the drift amount, and to a device for estimating a road surface friction state which estimates a road surface friction state by using the corrected lateral acceleration.

2. Description of the Related Art

Conventionally, techniques have been disclosed for estimating the drift amount of a lateral acceleration sensor and correcting the output of the lateral acceleration sensor on the basis of the drift amount (see, for example, Japanese Patent Application Laid-Open (JP-A) Nos. 9-5352, 11-281672). In the techniques disclosed in JP-A Nos. 9-5352 and 11-281672, the drift amount of a lateral acceleration sensor is detected on the basis of a signal of the lateral acceleration sensor and the difference in wheel speeds of the left and the right wheels.

Concretely, in the technique disclosed in JP-A No. 9-5352, at times which do not correspond to any of a time of acceleration or deceleration, a time of a vehicle spin, a time of high lateral acceleration, and a time of stopping, a lateral acceleration value, which is computed from the difference in wheel speeds of the left and right wheels, and a value of a lateral acceleration sensor are compared, and the drift amount of the lateral acceleration sensor is estimated.

Moreover, in the technique disclosed in JP-A No. 11-281672, the rotational speed of each wheel, and the longitudinal acceleration and the lateral acceleration are detected. By using these results of detection, it is judged whether the vehicle is traveling steadily (i.e., traveling straight ahead at a constant speed on a flat road). The output of the lateral acceleration sensor at the time of steady traveling is detected as the drift amount.

The techniques disclosed in JP-A Nos. 9-5352 and 11-281672 utilize the fact that, when the vehicle is in a state of traveling straight ahead in which the difference in the wheel speeds of the left and right wheels is zero, the lateral acceleration is zero.

However, the difference in the wheel speeds of the left and right wheels is a property which is affected and easily changed by the air pressure of the tires. Therefore, in a case in which, for example, both of the front and rear tires at one of the left and right sides have been punctured, or the like, a difference in wheel speeds between the left and right wheels will arise even if the vehicle is traveling straight forward. A problem will arise in that the drift amount will be estimated incorrectly.

SUMMARY OF THE INVENTION

The present invention has been proposed in order to overcome the above-described problems.

A first aspect of the present invention is a device for estimating a drift amount of a lateral acceleration sensor, the device comprising: a steering torque sensor detecting a steering torque; a lateral acceleration sensor detecting a lateral acceleration; and a drift amount estimating section estimating a drift amount of the lateral acceleration sensor on the basis of the steering torque, which is detected by the steering torque sensor, and the lateral acceleration, which is detected by the lateral acceleration sensor.

The steering torque sensor detects the steering torque applied to the steering shaft. The lateral acceleration detecting section detects the lateral acceleration which is the lateral direction acceleration of the vehicle body.

Here, when the driver steers, steering torque is generated, and lateral acceleration arises at the vehicle body. Because the steering torque and the lateral acceleration have a close relationship, when a drift amount is included in the lateral acceleration, a change in the relationship between the steering torque and the lateral acceleration arises in accordance with the drift amount.

Therefore, the drift amount estimating section can estimate the drift amount of the lateral acceleration sensor on the basis of the steering torque, which is detected by the steering torque sensor, and the lateral acceleration, which is detected by the lateral acceleration sensor.

Accordingly, in the first aspect of the present invention, by estimating the drift amount of a lateral acceleration sensor on the basis of the steering torque and the lateral acceleration and without using the difference in wheel speeds of the left and right wheels, the drift amount of the lateral acceleration sensor can be estimated accurately even in cases in which changes in the tire air pressure arise.

A second aspect of the present invention is a device for estimating a drift amount of a lateral acceleration sensor, the device comprising: a self-aligning torque computing section computing a self-aligning torque which corresponds to steering; a self-aligning torque model value computing section computing a self-aligning torque model value by using a lateral acceleration; and a drift amount estimating section which, on the basis of the self-aligning torque and the self-aligning torque model value, estimates a drift amount of a lateral acceleration sensor which detected the lateral acceleration.

The self-aligning torque computing section computes the self-aligning torque in accordance with the steering of the driver. The self-aligning torque is a moment generated around the central point of the tire, and is applied in a direction of returning the handle, which has been steered, to its original position.

On the other hand, when lateral acceleration arises at the vehicle body, the tire side slips, and self-aligning torque arises around the central point of the tire. Here, the self-aligning torque model value computing section computes a self-aligning torque model value, i.e., a theoretical self-aligning torque generated around the central point of the tire, by using the lateral acceleration.

When no drift amount is included in the lateral acceleration, the lateral acceleration changes in accordance with the state of steering. Therefore, the self-aligning torque is substantially proportional to the self-aligning torque model value. However, when a drift amount is included in the lateral acceleration, offset arises in the relationship between the self-aligning torque and the self-aligning torque model value in accordance with the drift amount.

The drift amount estimating section estimates the drift amount of the lateral acceleration sensor by using the relationship between the self-aligning torque, the self-aligning torque model value, and the drift amount.

Accordingly, in the second aspect of the present invention, the drift amount of the lateral acceleration sensor is estimated on the basis of the self-aligning torque which corresponds to the steering, and the self-aligning torque model value obtained by using the lateral acceleration. In this way, in the second aspect of the present invention, the drift amount can be estimated highly accurately without using the difference in wheel speeds of the left and right wheels and without being affected by changes in the tire air pressure.

A third aspect of the present invention is a device for estimating a road surface friction state, comprising: (A) a device for estimating a drift amount of a lateral acceleration sensor, which device has: (i) a self-aligning torque computing section computing a self-aligning torque which corresponds to steering; (ii) a self-aligning torque model value computing section computing a self-aligning torque model value by using a lateral acceleration; and (iii) a drift amount estimating section which, on the basis of the self-aligning torque and the self-aligning torque model value, estimates a drift amount of a lateral acceleration sensor which detected the lateral acceleration; (B) a lateral acceleration correcting section correcting the lateral acceleration detected by the lateral acceleration sensor, in accordance with the drift amount estimated by the device for estimating a drift amount of a lateral acceleration sensor; and (C) a road surface friction state estimating section estimating a road surface friction state on the basis of the self-aligning torque and the self-aligning torque model value, wherein the self-aligning torque model value computing section computes the self-aligning torque model value by using the lateral acceleration corrected by the lateral acceleration correcting section.

The road surface friction state estimating section estimates the road surface friction state on the basis of the self-aligning torque and the self-aligning torque model value. Here, the self-aligning torque model value is computed by using the lateral acceleration corrected by the lateral acceleration correcting section.

Accordingly, in the third aspect of the present invention, the road surface friction state can be highly accurately estimated by computing a self-aligning torque model value by using lateral acceleration from which the drift amount has been removed.

DESCRIPTION OF THE PREFERRED EMBODIMENT

Hereinafter, a preferred embodiment of the present invention will be described in detail with reference to the figures.

Figure 1:
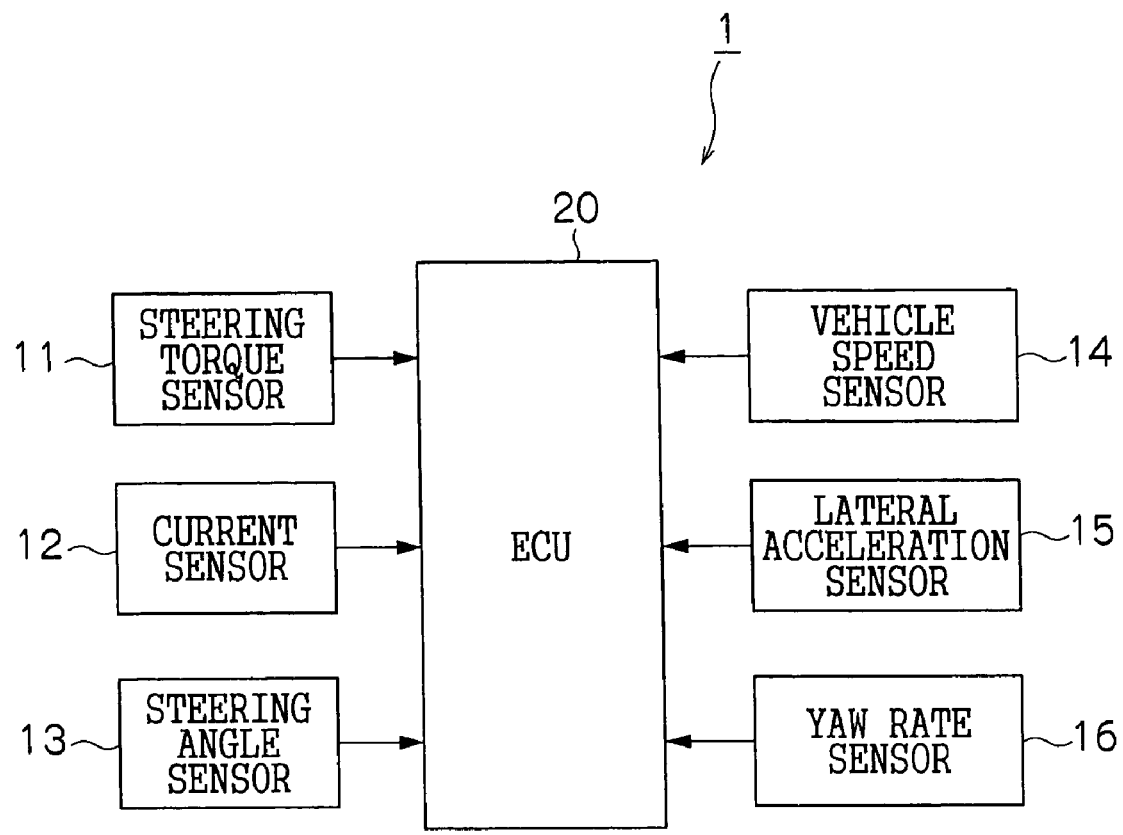
FIG. 1 is a block diagram showing the structure of a road surface friction state estimating device relating to an embodiment of the present invention.

FIG. 1 is a block diagram showing the structure of a road surface friction state estimating device 1 relating to the embodiment of the present invention. The road surface friction state estimating device 1 can be used, for example, in a vehicle equipped with an electric-motor-type power steering device, or can also be used in a vehicle equipped with a hydraulic-type power steering device as will be described later.

The road surface friction state estimating device 1 is equipped with a steering torque sensor 11 detecting the steering torque; a current sensor 12 detecting the motor current of the electric-motor-type power steering device; a steering angle sensor 13 detecting the steering angle; a vehicle speed sensor 14 detecting the vehicle speed; a lateral acceleration sensor 15 detecting the lateral acceleration; a yaw rate sensor 16 detecting the yaw rate; and an electronic control unit (ECU) 20 which estimates the road surface friction state by using signals outputted from the respective sensors.

The steering torque sensor 11 is mounted coaxially to the steering shaft. The steering torque sensor 11 supplies, to the ECU 20, a sensor signal which corresponds to the steering torque applied to the steering shaft. The current sensor 12 supplies, to the ECU 20, a sensor signal corresponding to the motor current of the electric motor used in the electric-motor-type power steering device.

The steering angle sensor 13 supplies, to the ECU 20, a sensor signal corresponding to a steering angle $\theta_p$ in accordance with the steering of the driver. The vehicle speed sensor 14 supplies, to the ECU 20, a sensor signal corresponding to vehicle speed (or wheel speed) u.

The lateral acceleration sensor 15 supplies, to the ECU 20 a sensor signal corresponding to the lateral direction acceleration of the vehicle (the lateral acceleration). The yaw rate sensor 16 supplies, to the ECU 20, a sensor signal corresponding to the yaw angle speed which arises at the vehicle body.

Figure 2:
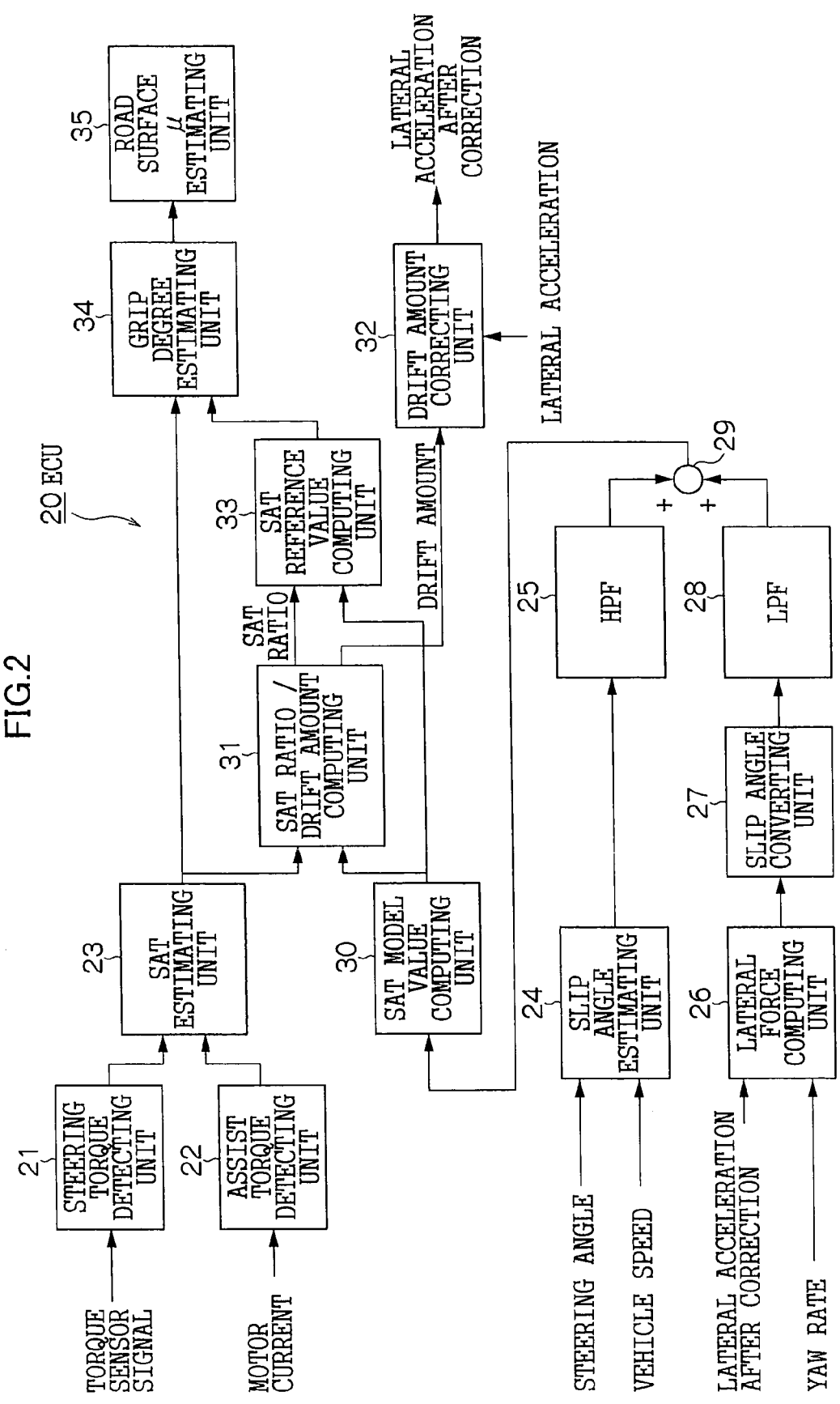
FIG. 2 is a block diagram showing the structure of an ECU.

FIG. 2 is a block diagram showing the structure of the ECU 20. The ECU 20 is equipped with a steering torque detecting unit 21 which detects the steering torque; an assist torque detecting unit 22 which detects the assist torque; an SAT estimating unit 23 which estimates the self-aligning torque (SAT); and a slip angle estimating unit 24 which estimates the slip angle.

The ECU 20 also has a high-pass filter 25 carrying out high-pass filter processing on the slip angle; a lateral force computing unit 26 which computes the lateral force of the front wheels of the vehicle; a slip angle converting unit 27 which converts the lateral force of the front wheels into a slip angle; a low-pass filter 28 carrying out low-pass filter processing on the converted slip angle; an adder 29 adding the two slip angles which have been subjected to the filter processings; and an SAT model value computing unit 30 which computes an SAT model value on the basis of the integrated slip angle obtained by the adding.

The ECU 20 further includes an SAT ratio/drift amount computing unit 31 which simultaneously computes the SAT ratio and the drift amount of the lateral acceleration sensor 15; a drift amount correcting unit 32 correcting the lateral acceleration detected at the lateral acceleration sensor 15; an SAT reference value computing unit 33 computing an SAT reference value; a grip degree estimating unit 34 which estimates the grip degree; and a road surface μ estimating unit 35 estimating the coefficient of friction of the road surface (the road surface μ).

On the basis of the sensor signal of the steering torque sensor 11, the steering torque detecting unit 21 detects the steering torque which is applied when the driver steers. The steering torque detecting unit 21 supplies the detected steering torque to the SAT estimating unit 23.

The assist torque detecting unit 22 detects the assist torque applied to the electric-motor-type power steering device, on the basis of the motor current based on the sensor signal of the current sensor 12, and parameters set in advance (e.g., the pinion lead, the ball screw lead, the assist motor torque coefficient). The assist torque detecting unit 22 supplies this assist torque to the SAT estimating unit 23. Note that, instead of the aforementioned motor current, the assist torque detecting unit 22 may use a current command value which is outputted to the motor from the electronic-motor-type power steering device.

The SAT estimating unit 23 estimates the SAT which is generated between the road surface and the tire, by removing the friction of the steering system by computing the sum of the steering torque, which is detected at the steering torque detecting unit 21, and the assist torque, which is detected at the assist torque detecting unit 22.

The slip angle estimating unit 24 estimates a front wheel slip angle $\alpha_E$ [rad] which is the slip angle of the tire of the front wheel, on the basis of a steering angle $\theta_p$ [rad] based on the sensor signal of the steering angle sensor 13 and on the basis of a vehicle speed u [m/s] based on the sensor signal of the vehicle speed sensor 14.

Here, the front wheel slip angle $\alpha_E$ is expressed by the equations of state which are equation (1) and equation (2), when using the dynamic characteristic of vehicle motion:

$$\frac{d}{dt}\begin{bmatrix} v \\ r \end{bmatrix} = \left( \begin{bmatrix} 0 & -1 \\ 0 & 0 \end{bmatrix} u + \begin{bmatrix} -\frac{c_f + c_r}{M} & -\frac{L_f c_f - L_r c_r}{M} \\ -\frac{L_f c_f - L_r c_r}{I_z} & -\frac{L_f^2 c_f + L_r^2 c_r}{I_z} \end{bmatrix} / u \right) \quad (1)$$

$$\begin{bmatrix} v \\ r \end{bmatrix} + \begin{bmatrix} \frac{c_f}{M g_h} \\ \frac{L_f c_f}{I_z g_h} \end{bmatrix} \theta_p$$

$$\alpha_E = [1 \ L_f] / u \begin{bmatrix} v \\ r \end{bmatrix} - \frac{\theta_p}{g_h} \quad (2)$$

wherein the respective parameters are as follows.
v: lateral speed [m/s]
r: yaw rate [rad/s]
u: vehicle speed [m/s]
$c_f$: front wheel cornering power [N/rad]
$c_r$: rear wheel cornering power [N/rad]
$L_f$: distance between centers of gravity of front axes [m]
$L_r$: distance between centers of gravity of rear axes [m]
M: vehicle mass [kg]
$I_z$: yaw inertia [kgm$^2$]
$g_h$: gear ratio during actual steering of handle When above equation (1) and equation (2) are made discrete by sampling time τ and are expressed as a function of the vehicle speed u, following equation (3) and equation (4) are obtained:

$$x(k+1) = \left( \begin{bmatrix} 1 & 0 \\ 0 & 1 \end{bmatrix} + \begin{bmatrix} 0 & -\tau \\ 0 & 0 \end{bmatrix} u(k) + \tau A_s / u(k) \right) x(k) + \tau B_s \theta_p(k) \quad (3)$$

$$\alpha_E(k) = [1 \ L_f] \times (k) / u(k) - \theta_p(k) / g_h \quad (4)$$

wherein k is the sampling number. Further, $A_s$ and $B_s$ of equation (3) are expressed by following equation (5).

$$A_s = \begin{bmatrix} -\frac{c_f + c_r}{M} & -\frac{L_f c_f - L_r c_r}{M} \\ -\frac{L_f c_f - L_r c_r}{I_z} & -\frac{L_f^2 c_f + L_r^2 c_r}{I_z} \end{bmatrix}, \ B_s = \begin{bmatrix} \frac{c_f}{M g_h} \\ \frac{L_f c_f}{I_z g_h} \end{bmatrix} \quad (5)$$

Here, the slip angle estimating unit 24 estimates the front wheel slip angle $\alpha_E$ by carrying out computation in accordance with formula (3) through formula (5) each sampling time τ. The slip angle estimating unit 24 supplies this front wheel slip angle $\alpha_E$ to the high-pass filter 25.

The high-pass filter 25 carries out high-pass filter processing on the front wheel slip angle $\alpha_E$ estimated at the slip angle estimating unit 24. Here, in a case in which the steering neutral point moves when the vehicle is traveling on a banked road, the front wheel slip angle $\alpha_E$ estimated at the slip angle estimating unit 24 includes a drift error in the low frequency region. However, the front wheel slip angle $\alpha_E$ includes, in the high frequency region, a signal component which does not have a phase delay with respect to the SAT estimated value. Thus, due to the high-pass filter 25 carrying out high-pass filter processing on the front wheel slip angle $\alpha_E$, the drift error in the low frequency region is removed, and only the high frequency component, which does not have a phase delay with respect to the SAT estimated value, is extracted.

The high-pass filter 25 is structured by a first-order discrete filter. Here, the first-order high pass filter in a continuous time period is expressed by the transfer function of equation (6):

$$G_H(s) = \frac{s}{s + \omega_b} \quad (6)$$

wherein $\omega_b$ is the break point frequency. When equation (6) is converted by using a method such as Tustin conversion or the like, it is possible to set a high-pass filter of a discrete time. In the Tustin conversion, given that the sampling time is T and the time lead operator is z, s is expressed by equation (7).

$$s = \frac{2(z-1)}{T(z+1)} \quad (7)$$

When equation (7) is substituted into equation (6), the high-pass filter of a discrete time is expressed by equation (8).

$$G_L(z) = \frac{2(z-1)}{(T\omega_b + 2)z + T\omega_b - 2} \qquad (8)$$

Here, the high-pass filter 25 carries out high-pass filter processing on the front wheel slip angle $\alpha_E$ in accordance with equation (8). The high-pass filter 25 supplies the front wheel slip angle $\alpha_E$, which was subjected to the filter processing, to the adder 29.

The lateral force computing unit 26 computes a front wheel lateral force $F_f$, which is the lateral force arising at the front wheel tire, by using a lateral speed $g_y$ corrected at the drift amount correcting unit 32 which will be described later, and by using the yaw rate r which is based on the sensor signal of the yaw rate sensor 16.

Here, the front wheel lateral force $F_f$ satisfies the equation of motion of following equation (9) for the lateral speed $g_y$. The front wheel lateral force $F_f$ satisfies the equation of motion of following equation (10) for the yaw rate r.

$$M\left(\frac{dv}{dt} + ru\right) = F_f + F_r \qquad (9)$$

$$I_z \frac{dr}{dt} = L_f F_f - L_r F_r \qquad (10)$$

In the equations, $F_r$ is the rear wheel lateral force. Moreover, the lateral speed $g_y$ is as per following equation (11).

$$g_y = \frac{dv}{dt} + ru \qquad (11)$$

By arranging equation (9) and equation (10), the front wheel lateral force $F_f$ is as per equation (12).

$$F_f = \frac{L_r M g_y + I_z \frac{dr}{dt}}{L_f + L_r} \qquad (12)$$

Here, the lateral force computing unit 26 computes the front wheel lateral force $F_f$ in accordance with above equation (12) by using the yaw rate r and the lateral acceleration $g_y$, and supplies this front wheel lateral force $F_f$ to the slip angle converting unit 27.

The slip angle converting unit 27 converts the front wheel lateral force $F_f$ to a front wheel slip angle $\alpha_T$ by dividing the front wheel lateral force $F_f$, which was supplied from the lateral force computing unit 26, by the front wheel cornering power $c_f$. Specifically, the slip angle converting unit 27 computes following equation (13).

$$\alpha_T = -\frac{F_f}{c_f} \qquad (13)$$

The low-pass filter 28 carries out low-pass filter processing on the front wheel slip angle $\alpha_T$ computed at the slip angle converting unit 27. Here, the front wheel slip angle $\alpha_T$ computed at the slip angle converting unit 27 includes, in the high frequency region, a fluctuating component such as noise or a phase delay or the like which is affected by road surface disturbance. However, the front wheel slip angle $\alpha_T$ includes a low frequency component which is not affected even if the vehicle is traveling on a banked road. Thus, by subjecting the front wheel slip angle $\alpha_T$ to low-pass filter processing, the low-pass filter 28 removes the fluctuating component of the high frequency region, and extracts only the low frequency component which was computed accurately.

Concretely, the low-pass filter 28 is structured as a first-order discrete filter having a break point frequency which is the same as that of the high-pass filter 25. Here, the first-order low-pass filter in a continuous time period is expressed by the transfer function of following equation (14).

$$G_L(s) = \frac{\omega_b}{s + \omega_b} \qquad (14)$$

When equation (14) is Tustin converted, a low-pass filter of a discrete time period is obtained, and is expressed by following equation (15).

$$G_L(z) = \frac{T\omega_b(z+1)}{(T\omega_b + 2)z + T\omega_b - 2} \qquad (15)$$

Here, the low-pass filter 28 carries out low-pass filter processing on the front wheel slip angle $\alpha_T$ in accordance with equation (15), and supplies the front wheel slip angle $\alpha_T$, which has been subjected to this filter processing, to the adder 29.

Note that the break point frequency is not particularly limited, but is preferably a frequency such that the noise accompanying the road surface disturbance can be removed, or is a frequency which can handle the road surface canting change speed at the time when the vehicle enters onto a banked road.

The adder 29 adds the front wheel slip angle $\alpha_E$, which was supplied from the high-pass filter 25, and the front wheel slip angle $\alpha_T$, which was supplied from the low-pass filter 28, and computes an integrated slip angle $\alpha_I$. Namely, the adder 29 calculates following equation (16).

$$\alpha_I(z) = G_H(z) \cdot \alpha_E(z) + G_L(z) \cdot \alpha_T(z) \qquad (16)$$

Here, the sum of the transfer function of the high-pass filter 25 and the transfer function of the low-pass filter 28 is 1. This means that, when the same signal is inputted to the high-pass filter and the low-pass filter and the outputs of the respective filters are added, the original signal is restored. Accordingly, the adder 29 can compute the slip angle $\alpha_I$ which does not have a drift error, noise, or the like, and which does not have a phase delay with respect to the self-aligning torque.

The SAT model value computing unit 30 computes an SAT model value by using the integrated slip angle $\alpha_I$. Here, the SAT model value is the value of the SAT of a model (i.e., a linear model linearized at slip angle 0) which presupposes a high grip state in the state of the nominal ground-contact length which is the standard for the design. Concretely, the SAT model value computing unit 30 computes following equation (17):

$$T_m = K_0 \cdot \alpha_I \qquad (17)$$

wherein $K_0$ is the origin slope (the SAT slope), with respect to the front wheel slip angle, of the SAT model value in a case in which there is no change in load of the vehicle and no decrease in tire air pressure. The SAT model value is expressed by the product of the origin slope $K_0$ and the integrated slip angle $\alpha_I$ as in equation (17). The SAT model value is the value of a theoretical SAT in a high grip state and with no changes in the load of the vehicle and no decrease in tire air pressure.

In this way, because the SAT model value computing unit 30 computes the SAT model value on the basis of the slip angle $\alpha_I$, it is possible to obtain an SAT model value in which there is no drift error, noise or the like, and in which there is no phase delay with respect to the self-aligning torque. The SAT model value computing unit 30 supplies the SAT model value, which was computed in accordance with equation (17), to the SAT ratio/drift amount computing unit 31.

The SAT ratio/drift amount computing unit 31 computes, by on-line identification, the ratio of the SAT estimated value to the SAT model value (i.e., the SAT ratio), and the drift amount of the lateral acceleration sensor 15.

Here, the effect which the drift error (steady error) of the lateral acceleration sensor 15 has on the integrated slip angle $\alpha_I$ is as per following equation (18):

$$\alpha_{drift} = -\frac{L_r M}{c_f (L_f + L_r)} g_{drift} \tag{18}$$

wherein the respective parameters are as follows:
$\alpha_{drift}$: drift error of the integrated slip angle
$g_{drift}$: drift error of the lateral acceleration sensor 15
$c_f$: front wheel cornering power [N/rad]
$L_f$: distance between centers of gravity of front axes [m]
$L_r$: distance between centers of gravity of rear axes [m]
M: vehicle mass [kg]

The algorithm for deriving the SAT ratio is given by equation (19) through equation (21):

$$K[k] = \frac{P[k] \cdot \phi[k]}{1 + \phi[k]^T \cdot P[k] \phi[k]} \tag{19}$$

$$\theta[k+1] = \theta[k] + K[k] \cdot (y[k] - \phi[k]^T \cdot \theta[k]) \tag{20}$$

$$P[k+1] = L \cdot \left( P[k] - \frac{P[k] \cdot \phi[k] \cdot \phi[k]^T \cdot P[k]}{1 + \phi[k]^T \cdot P[k] \cdot \phi[k]} \right) \tag{21}$$

wherein following equation (22) through equation (24) are established:

$$y[k] = T_{SAT}[k] \tag{22}$$

$$\phi[k] = \begin{bmatrix} T_m[k] \\ -\frac{L_r M}{c_f (L_f + L_r)} \end{bmatrix} \tag{23}$$

$$L = \begin{bmatrix} \lambda_1^{-\frac{1}{2}} & 0 \\ 0 & \lambda_2^{-\frac{1}{2}} \end{bmatrix} \tag{24}$$

Here, the respective parameters are as follows.
$\theta$: estimation parameter
(first element: SAT ratio, second element: drift amount of lateral acceleration sensor 15)
$\lambda_1$: forgetting coefficient relating to SAT ratio estimation
$\lambda_2$: forgetting coefficient relating to estimation of drift amount of lateral acceleration sensor 15
$T_{SAT}$: SAT estimated value
$T_m$: SAT model value
k: sampling point number Generally, drift of the lateral acceleration sensor arises due to dispersion between individual manufactured products, or changes over the years, or the like, and changes relatively slowly. Therefore, in the on-line identification computation, it is preferable that the change in the drift amount is small as compared with the change in the SAT ratio.

Namely, the speed of change of the SAT ratio is relatively high as compared with that of the drift amount. Therefore, in the present embodiment, the forgetting coefficient $\lambda_1$ relating to the SAT ratio estimation is set to be a small value. Conversely, the speed of change of the drift amount is relatively low as compared with that of the SAT ratio. Therefore, the forgetting coefficient $\lambda_2$ relating to the drift amount estimation is set to be a large value. The forgetting coefficients $\lambda$ are not particularly limited, but in the present embodiment, are, for example, the values of following equation (25) and equation (26).

$$\lambda_1 = 0.990 \tag{25}$$

$$\lambda_2 = 0.995 \tag{26}$$

By using the forgetting coefficients $\lambda$ which are set for each parameter such in equation (25) and equation (26), the SAT ratio/drift amount computing unit 31 carries out on-line identification computation in accordance with equation (19) through equation (21). In this way, the SAT ratio/drift amount computing unit 31 can suppress the dispersion in the estimated value of the drift amount of the lateral acceleration sensor 15, and can accurately estimate the SAT ratio following actual changes.

Moreover, in the state in which the vehicle travels straight forward in which the SAT estimated value and the SAT model value are small, it is feared that the accuracy of estimating the slope (the SAT ratio) will deteriorate due to the error at the time of removing the steering system friction or the like. Therefore, it is best to make it difficult for the data, which is in a vicinity of the state in which the vehicle is traveling straight forward, to be reflected in the estimation of the SAT ratio.

For example, it suffices for the SAT ratio/drift amount computing unit 31 to set a threshold value relating to the SAT estimated value and the SAT model value, and in the state in which the vehicle travels straight forward in which the SAT estimated value and the SAT model value are less than or equal to the threshold value, the forgetting coefficient relating to the SAT ratio is set as per equation (27) for example.

$$\lambda_1 = 1.000 \tag{27}$$

As a result, in a state in which the vehicle is traveling straight forward or is traveling substantially straight forward, the SAT ratio/drift amount computing unit 31 can make the speed of change of the estimated value of the SAT ratio small, and can make the weight of the data which has good accuracy during turning to be large. Namely, the SAT ratio/drift amount computing unit 31 can estimate the drift amount while making small the effects of the self-aligning torque and the self-aligning torque model value which are computed in the state in which the vehicle is traveling straight forward or is traveling substantially straight forward.

Figure 3:
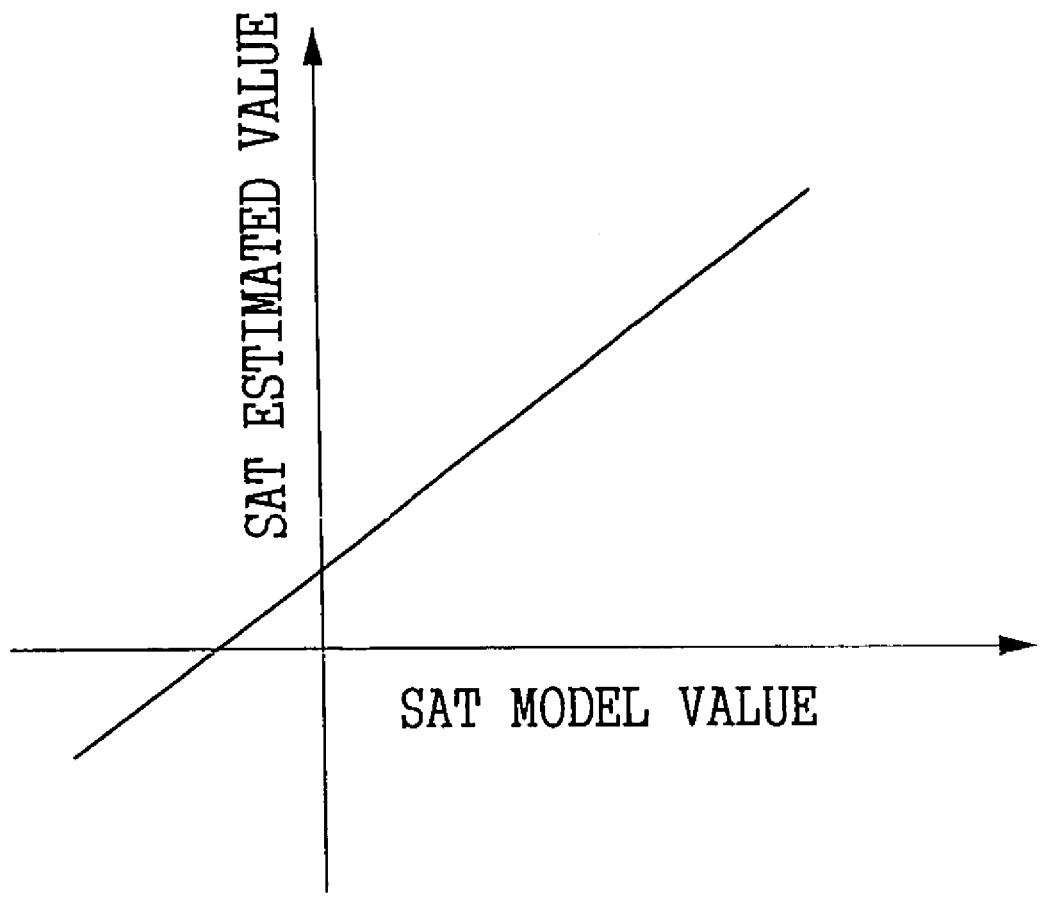
FIG. 3 is a diagram showing the relationship between an SAT model value and an SAT estimated value.

FIG. 3 is a diagram showing the relationship between the SAT model value and the SAT estimated value. Here, the horizontal axis is the SAT model value computed by the SAT model value computing unit 30. The vertical axis is the SAT estimated value obtained by the SAT estimating unit 23.

The first element of the estimation parameter θ is the slope of the characteristic shown in FIG. 3. The second element of the estimation parameter θ is the value obtained by multiplying a constant (the second element at the right side of equation (23)) by an intercept of the characteristic shown in FIG. 3. Note that, in a case in which there is no drift error in the lateral acceleration sensor 15, the second element of the estimation parameter θ is zero.

Figure 4A:
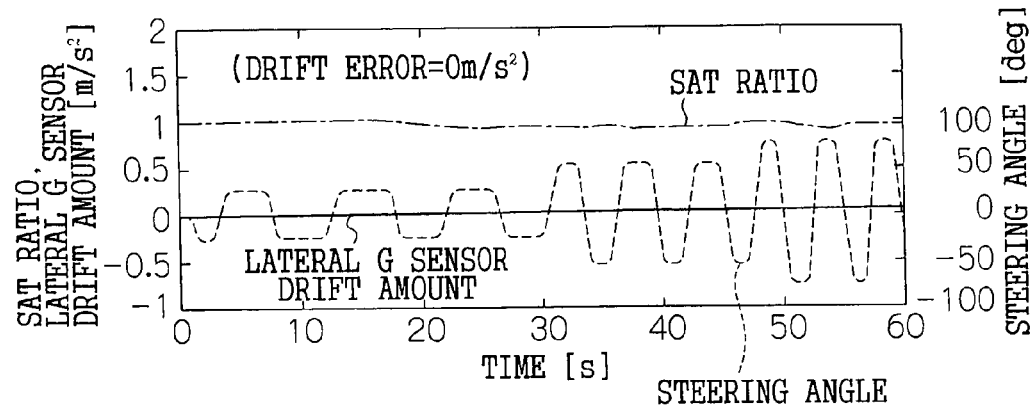
FIG. 4A is a diagram showing an SAT ratio and an estimated value of a drift amount of a lateral acceleration sensor (a lateral G sensor drift amount) when there is no drift error.
Figure 4B:
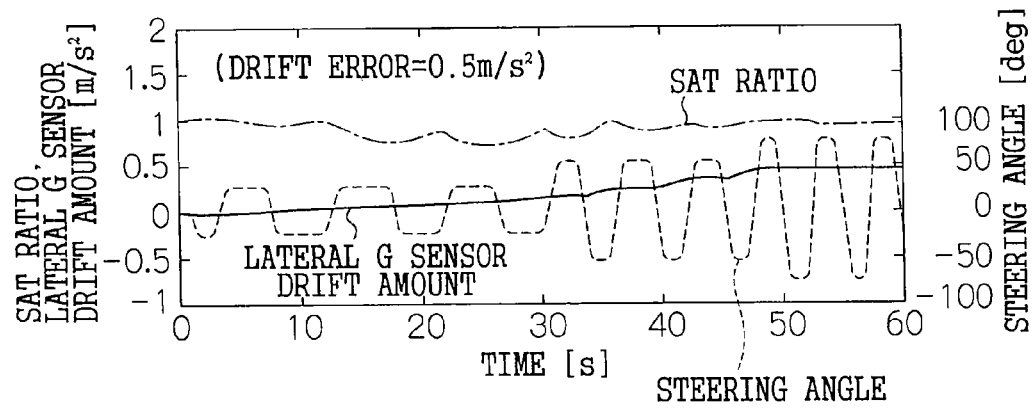
FIG. 4B is a diagram showing an SAT ratio and an estimated value of a drift amount of a lateral acceleration sensor (a lateral G sensor drift amount) when there is a drift error.

FIGS. 4A and 4B are diagrams showing the SAT ratio and the estimated value of the drift amount of the lateral acceleration sensor 15 (the lateral G sensor drift amount) when steering is repeated while traveling at 40 km/h on a high μ road in a state in which there are no changes in load or tire air pressure.

FIG. 4A is a diagram showing the results of estimation at the time when using the lateral acceleration sensor 15 which does not have a drift error. The estimated value of the drift amount was about 0 m/s². FIG. 4B is a diagram showing the results of estimation at the time when a drift amount of the lateral acceleration sensor 15 of 0.5 m/s² was artificially added. The drift amount was a value (0.5 m/s²) near to the true value at about 60 s from the start of estimation.

Note that, in FIG. 4A and FIG. 4B, the forgetting coefficient $\lambda_2$ relating to the drift amount estimation of the lateral acceleration sensor 15 was made to be smaller than the actual value (e.g., equation (26)), in order to show the results of the method of estimation. At the time of actual use, the speed of change in the drift amount of the lateral acceleration sensor 15 is considered, and the forgetting coefficient $\lambda_2$ is set to be greater than in the cases of FIGS. 4A and 4B. In this way, the stability of the estimated value of the drift amount can be improved.

The drift amount correcting unit 32 corrects the output value of the lateral acceleration sensor 15 so as to remove the drift amount computed by the SAT ratio/draft amount computing unit 31, and computes an accurate lateral acceleration which does not have a drift amount. Then, the lateral acceleration obtained at the drift amount correcting unit 32 is used at the previously-described lateral force computing unit 26, or is used in the road surface μ estimating unit 35 which will be described later.

The SAT reference value computing unit 33 computes the SAT reference value by, on the basis of the SAT ratio supplied from the SAT ratio computing unit 26, correcting, as needed, the SAT model value computed by the SAT model value computing unit 30.

Concretely, the SAT reference value computing unit 33 judges whether or not the maximum value of the SAT ratio within a predetermined time period has exceeded a threshold value. If the maximum value of the SAT ratio within the predetermined time period has not exceeded the threshold value, the ground-contact length between the tire and the road surface remains constant, and therefore, the SAT reference value computing unit 33 outputs the SAT model value, which presupposes a state of a nominal ground-contact length, as is as the SAT reference value.

On the other hand, when the maximum value of the SAT ratio within the predetermined time period exceeds the threshold value, the ground-contact length between the tire and the road surface has increased due to the addition of load or a decrease in the tire air pressure. At this time, the SAT reference value computing unit 33 judges that the SAT ratio has become large, and determines an SAT reference value which is a value which corrects the SAT model value upward. The computational formula for this upward correction is following equation (28):

$$T_{SATOm} = T_{SATO} \gamma \tag{28}$$

wherein the respective parameters are as follows:

$T_{SATOm}$: SAT reference value $T_{SATO}$: SAT model value before correction

γ: parameter for upward correction (in the present embodiment, the maximum value of the SAT ratio within a predetermined time period)

For example, "1.2" can be used as the threshold value compared with the SAT ratio. Note that, in consideration of the fact that adjustment of the air pressure is not carried out during traveling, γ may be set as a parameter which does not decrease, provided that a stopped state of a given time or more does not continue.

In this way, when the maximum value of the SAT ratio exceeds the threshold value, the SAT reference value computing unit 33 computes an SAT reference value based on the SAT ratio and the SAT model value. When the maximum value of the SAT ratio does not exceed the threshold value, the SAT reference value computing unit 33 outputs the SAT model value as the SAT reference value. The SAT reference value computing unit 33 supplies the SAT reference value $T_{SATOm}$, which was determined as described above, to the grip degree estimating unit 34.

The grip degree estimating unit 34 estimates a grip degree ε in accordance with following equation (29) on the basis of the SAT estimated value $T_{SAT}$ which is estimated at the SAT estimating unit 23, and on the basis of the SAT reference value $T_{SATOm}$ which is computed at the SAT reference value computing unit 33.

$$\varepsilon = \frac{T_{SAT}}{T_{SATOm}} \tag{29}$$

Note that the grip degree estimating unit 34 is not limited to the case of estimating the grip degree ε in accordance with the above-described method, and may utilize another method. For example, the grip degree estimating unit 34 may estimate the grip degree ε by a function of the SAT reference value $T_{SATOm}$ and the SAT estimated value $T_{SAT}$, or may estimate the grip degree ε by a two-dimensional map of the SAT reference value $T_{SATOm}$ and the SAT estimated value $T_{SAT}$.

When a state arises in which the grip degree ε estimated at the grip degree estimating unit 34 is less than or equal to a predetermined judgment reference (e.g., ε≦0.5), the road surface μ estimating unit 35 estimates the road surface μ from that grip degree ε and the lateral acceleration $g_y$ corrected at the drift amount correcting unit 32.

Here, the road surface μ is expressed by following equation (30):

$$\mu = \frac{g_{fy}}{(1-\varepsilon)g} \tag{30}$$

where g is gravitational acceleration. Further, $g_{fy}$ is the front wheel position lateral acceleration, and is expressed by following equation (31).

$$g_{fy} = \frac{L_r g_y + \frac{I_Z}{M}\frac{dr}{dt}}{L_f + L_r} \tag{31}$$

The smaller the grip degree $\varepsilon$, i.e., the closer that the grip degree $\varepsilon$ is to the limit, the more the accuracy of estimating the road surface $\mu$ determined in this way is improved. Here, as described above, when the grip degree $\varepsilon$ is less than or equal to the predetermined judgment reference, the road surface $\mu$ estimating unit 35 estimates the road surface $\mu$ in accordance with equation (30).

As described above, the road surface friction state estimating device 1 relating to the embodiment of the present invention can estimate the drift amount of the lateral acceleration sensor 15 by utilizing the property that the intercept of the SAT estimated value—SAT model value characteristic varies in accordance with the drift amount of the lateral acceleration sensor 15. Further, the road surface friction state estimating device 1 corrects the output value of the lateral acceleration sensor 15 on the basis of the drift amount. Therefore, the road surface friction state estimating device 1 always determines an accurate lateral acceleration, and as a result, can estimate the grip degree and the road surface $\mu$ with high accuracy.

Note that the present invention is not limited to the above-described embodiment, and various changes in design can be carried out within the scope recited in the claims.

For example, in the above embodiment, an example is described of a case in which the road surface friction state estimating device 1 estimates the drift amount of the lateral acceleration sensor 15, the grip degree, and the road surface $\mu$, by using the electric-motor-type power steering device. The road surface friction state estimating device 1 can also utilize a hydraulic-type power steering device. In this case, operations similar to those of the above-described embodiment can be carried out by the road surface friction state estimating device 1 measuring the oil pressure or the like of the hydraulic-type power steering device, and detecting each of the steering torque and the torque corresponding to the assist torque.

Moreover, in place of the SAT estimating unit 23, an SAT detecting unit (or an SAT detecting sensor), which can directly detect the self-aligning torque, may be provided.

What is claimed is:

1. A device for estimating a drift amount of a lateral acceleration sensor, the device comprising:
   a steering torque sensor detecting a steering torque;
   a lateral acceleration sensor detecting a lateral acceleration;
   a drift amount estimating section estimating a drift amount of the lateral acceleration sensor on the basis of the steering torque, which is detected by the steering torque sensor, and the lateral acceleration, which is detected by the lateral acceleration sensor,
   a self-aligning torque computing section computing one of an estimated value and a detected value of self-aligning torque by using the steering torque detected by the steering torque sensor,
   a self-aligning torque model value computing section which computes a self-aligning torque model value on the basis of the lateral acceleration detected by the lateral acceleration sensor,
   wherein the drift amount estimating section estimates the drift amount of the lateral acceleration sensor on the basis of the self-aligning torque and the self-aligning torque model value which is computed by the self-aligning torque model value computing section.

2. The device for estimating a drift amount of a lateral acceleration sensor of claim 1, a wheel speed detecting sensor detecting a wheel speed; and a steering angle detecting sensor detecting a steering angle,
   wherein the self-aligning torque model value computing section has: a slip angle estimating section estimating a slip angle on the basis of the wheel speed, which is detected by the wheel speed detecting sensor, and the steering angle, which is detected by the steering angle detecting sensor; a high-pass filter carrying out high-pass filter processing on the slip angle estimated by the slip angle estimating section; a lateral force computing section computing a lateral force on the basis of the lateral acceleration detected by the lateral acceleration sensor; a slip angle converting section converting the lateral force, which is computed by the lateral force computing section, into a slip angle; a low-pass filter carrying out low-pass filter processing on the slip angle converted by the slip angle converting section; an adding section adding the slip angle, which was subjected to high-pass filter processing by the high-pass filter, and the slip angle, which was subjected to filter processing by the low-pass filter; and a computing section computing the self-aligning torque model value on the basis of the slip angle obtained by addition by the adding section.

3. The device for estimating a drift amount of a lateral acceleration sensor of claim 1, wherein the drift amount estimating section estimates the drift amount on the basis of an intercept of a straight line expressing a relationship between the self-aligning torque and the self-aligning torque model value.

4. The device for estimating a drift amount of a lateral acceleration sensor of claim 1, wherein the drift amount estimating section estimates a slope of a straight line expressing a relationship between the self-aligning torque and the self-aligning torque model value, and estimates the drift amount based on an intercept of the straight line.

5. The device for estimating a drift amount of a lateral acceleration sensor of claim 4, wherein the drift amount estimating section estimates the drift amount such that changes in the intercept are small as compared with changes in the slope of the straight line.

6. The device for estimating a drift amount of a lateral acceleration sensor of claim 4, wherein the drift amount estimating section estimates the drift amount while making small the effects of the self-aligning torque model value and the self-aligning torque computed in one of a state in which a vehicle is traveling straight forward and a state in which the vehicle is traveling substantially straight forward.

7. A device for estimating a road surface friction state, comprising:
   the device for estimating a drift amount of a lateral acceleration sensor of claim 4;

a lateral acceleration correcting section correcting the lateral acceleration detected by the lateral acceleration sensor, in accordance with the drift amount estimated by the device for estimating a drift amount of a lateral acceleration sensor;

a self-aligning torque reference value computing section computing a self-aligning torque reference value on the basis of the slope of the straight line estimated by the drift amount estimating section, and the self-aligning torque model value computed by the self-aligning torque model value computing section; and a road surface friction state estimating section estimating a road surface friction state on the basis of the self-aligning torque and the self-aligning torque reference value, wherein the self-aligning torque model value computing section computes the self-aligning torque model value by using the lateral acceleration corrected by the lateral acceleration correcting section.

8. A device for correcting output of a lateral acceleration sensor, the device comprising:

the device for estimating a drift amount of a lateral acceleration sensor of claim 1; and a lateral acceleration correcting section correcting the lateral acceleration detected by the lateral acceleration sensor, in accordance with the drift amount estimated by the device for estimating a drift amount of a lateral acceleration sensor.

9. A device for estimating a road surface friction state, comprising:

the device for estimating a drift amount of a lateral acceleration sensor of claim 1;

a lateral acceleration correcting section correcting the lateral acceleration detected by the lateral acceleration sensor, in accordance with the drift amount estimated by the device for estimating a drift amount of a lateral acceleration sensor; and a road surface friction state estimating section estimating a road surface friction state on the basis of the self-aligning torque and the self-aligning torque model value, wherein the self-aligning torque model value computing section computes the self-aligning torque model value by using the lateral acceleration corrected by the lateral acceleration correcting section.

10. A device for estimating a drift amount of a lateral acceleration sensor, the device comprising:

a self-aligning torque computing section computing a self-aligning torque which corresponds to steering torque;

a self-aligning torque model value computing section computing a self-aligning torque model value by using a lateral acceleration; and a drift amount estimating section which, on the basis of the self-aligning torque and the self-aligning torque model value, estimates a drift amount of a lateral acceleration sensor which detected the lateral acceleration.

11. The device for estimating a drift amount of a lateral acceleration sensor of claim 10, wherein the drift amount estimating section estimates, as the drift amount, a value which corresponds to an intercept of a straight line expressing a relationship between the self-aligning torque and the self-aligning torque model value.

12. The device for estimating a drift amount of a lateral acceleration sensor of claim 10, wherein the self-aligning torque model value computing section computes lateral force by using the lateral acceleration, and computes the self-aligning torque model value by using the lateral force.

13. A device for estimating a road surface friction state, comprising:

a device for estimating a drift amount of a lateral acceleration sensor, which device has: a self-aligning torque computing section computing a self-aligning torque which corresponds to steering torque; a self-aligning torque model value computing section computing a self-aligning torque model value by using a lateral acceleration; and a drift amount estimating section which, on the basis of the self-aligning torque and the self-aligning torque model value, estimates a drift amount of a lateral acceleration sensor which detected the lateral acceleration;

a lateral acceleration correcting section correcting the lateral acceleration detected by the lateral acceleration sensor, in accordance with the drift amount estimated by the device for estimating a drift amount of a lateral acceleration sensor; and a road surface friction state estimating section estimating a road surface friction state on the basis of the self-aligning torque and the self-aligning torque model value, wherein the self-aligning torque model value computing section computes the self-aligning torque model value by using the lateral acceleration corrected by the lateral acceleration correcting section.

* * * * *